United States Patent
Vandamme (10) Patent No.: US 8,635,951 B2
(45) Date of Patent: Jan. 28, 2014

(54) CROP PARAMETER DEPENDENT BALE CHAMBER CONFIGURATION ADAPTATION

(71) Applicant: CNH America LLC, New Holland, PA (US)

(72) Inventor: Dirk A. R. Vandamme, Uitkerke (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/741,993

(22) Filed: Jan. 15, 2013

(65) Prior Publication Data
US 2013/0180417 A1    Jul. 18, 2013

(30) Foreign Application Priority Data
Jan. 16, 2012    (BE) .................................. 2012/0033

(51) Int. Cl.
*B30B 13/00* (2006.01)
*A01F 15/04* (2006.01)
*A01F 15/08* (2006.01)

(52) U.S. Cl.
USPC ................. 100/35; 100/43; 100/50; 100/189; 100/191

(58) Field of Classification Search
USPC ......... 100/3, 7, 35, 43, 48, 49, 50, 73, 188 R, 100/189, 191, 192; 56/341
See application file for complete search history.

(56) References Cited

U.S. PATENT DOCUMENTS

| | | | | |
|---|---|---|---|---|
| 2,596,872 | A | * | 5/1952 | Skromme .................... 100/191 |
| 4,125,071 | A | | 11/1978 | Young |
| 4,489,648 | A | * | 12/1984 | Naaktgeboren ............. 100/191 |
| 4,750,418 | A | | 6/1988 | Naaktgeboren |
| 5,819,643 | A | * | 10/1998 | McIlwain et al. ............ 100/43 |
| 7,975,607 | B2 | * | 7/2011 | Hoover et al. .............. 100/191 |

FOREIGN PATENT DOCUMENTS

| | | |
|---|---|---|
| EP | 1606992 A1 | 12/2005 |
| GB | 972562 A | 10/1964 |

* cited by examiner

*Primary Examiner* — Jimmy T Nguyen
(74) *Attorney, Agent, or Firm* — Patrick M. Sheldrake (57) ABSTRACT

A baler having a bale chamber comprising chamber doors pivotably connected to a fixed frame part. Upon obtaining at least one crop parameter, a door angle value between two side sections of a door is selected; and the position of one of the side sections with respect to the other one is adapted in accordance with the selected door angle value. A corresponding baler and a control system for such baler are also provided.

15 Claims, 5 Drawing Sheets

CROP PARAMETER DEPENDENT BALE CHAMBER CONFIGURATION ADAPTATION

CROSS REFERENCE TO RELATED APPLICATIONS

This patent application claims priority under 35 U.S.C. §119 to BE 2012/0033, filed on Jan. 16, 2012 titled, "Crop Parameter Dependent Bale Chamber Configuration Adaptation" and having Dirk Vandamme as an inventor. The full disclosure of BE 2012/0033 is hereby fully incorporated herein by reference.

FIELD OF THE INVENTION

The present invention generally relates to a baler for creating cuboid-shaped bales of agricultural crop material. More particularly, the present invention relates to a method and a control system for preparing the bale chamber of such baler for manufacturing high density bales of harvested crop material and a baler adapted therefore.

BACKGROUND OF THE INVENTION

An agricultural baler is a trailed machine (PTM—pulled type machine) used in agriculture for the purpose of creating bales of (typically) straw or other biomass such as hay, silage or similar crop material produced during a harvesting or mowing operation.

Various designs of balers have been proposed in the prior art. A common characteristic of virtually all balers is that they are towed behind agricultural vehicles such as tractors. A baler includes an infeed via which biomass is ingested into the interior of the baler where it is compressed or otherwise treated to form bales. The completed bales are tied with twine or another lineal object to make them rigid and self-supporting, after which they are ejected via a discharge chute typically at the rear of the baler so as to fall or be placed on the ground behind the tractor/baler combination as its moves forwardly along a harvested field.

In the 1970's and 1980's, so-called "round" balers were developed. These produce large cylindrical bales. Although many round balers are still sold annually and many more remain in use, in many areas their popularity has been usurped by "rectangular" or "square" balers. Such balers produce cuboid-shaped bales which have a number of advantages over "round" bales.

As a first advantage, the handling of cuboid-shaped bales is more convenient and is safer. Additionally as a result of the cuboid shapes of the bales it is relatively easy to transport them and stack them for temporary or long term storage in stable structures either in fields or in farmyards. Cuboid-shaped bales can be produced with a high density. When used, cuboid-shaped bales are also easily distributed as they are formed from a number of slices.

A significant advantage of rectangular balers over round balers is that it is possible to adjust the characteristics of a cuboid-shaped bale in some cases while the bale is being formed.

This is important because straw or other baled biomass is an economically valuable crop. Very often the value of baled biomass is assessed on the basis of the weight of each bale produced by the operation of the baler. It can be very important to control the density of the baled biomass in order to assure that the bale weights are substantially constant during passage of a baler from one part of a field to another. Variations, however, in the characteristics (especially the moisture) of the baled biomass ingested from different places of the field into the baler may mean that there is a frequent or even constant need to adjust bale density during baling operations in order to meet the objective of constant bale mass.

In a rectangular baler it is possible to adjust the bale density, as the baler includes a substantially cuboid-shaped bale-forming chamber. It is known in the art to construct the bale-forming chamber with one or more moveable side walls. The positions of the side walls can be adjusted so as to alter the volume of the bale-forming chamber and thereby squeeze the bale during its formation to a greater or lesser degree. If, as is commonplace in a baler, each charge or flake of ingested biomass is substantially of constant volume, causing a reduction in the volume of the bale-forming chamber in this way leads to the creation of higher density bales, and vice versa. This, in turn, provides an ability to control the densities of the formed bales.

In more detail, each charge introduced into the bale-forming chamber is, at the point of introduction, uncompressed or compressed to a relatively low level only. It is moved along the bale-forming chamber by longitudinal strokes of a piston or plunger that reciprocates under the action of an attached arm that in turn is driven by a bell crank e.g. secured to a rotating member. Each stroke of the piston therefore compresses an amount of biomass against the biomass already available in the bale-forming chamber. In consequence, the density of the formed bale increases if the volume into which the biomass is swept is reduced as a result of adjustments of the positions of the sidewalls of the chamber at locations "downstream" of the furthest point reached by the piston during its motion.

The dimensions of cuboid-shaped bales, however, are substantially fixed, firstly because of the cross-sectional dimensions of the bale-forming chamber and secondly because the baler forms the biomass into identical bale lengths which are ejected via the discharge as substantially identical, individual bales.

An example of a bale-forming chamber with adjustable sidewall is shown in U.S. Pat. No. 4,037,528. This disclosure describes sidewalls that are moveable under the influence of cam-like arms that are caused to rotate by attached hydraulic rams. The arrangement defines a pair of four-bar linkages each including one of the sidewalls. Operation of the associated ram therefore causes the sidewall to move inwardly or outwardly, relative to the interior of the bale-forming chamber, in an even fashion causing uniform alteration of the chamber volume over a portion of its length. A more modern form of bale density adjustment that is suitable for inclusion in a rectangular baler is disclosed in EP0655190.

In WO2010/100068 the need is disclosed for an approach to apply tension to a bale in a bale chamber of an agricultural baler to enable control of the bale characteristics (in particular the length of bales, especially for small cuboid-shaped bales to facilitate efficiency of use of bale handling equipment) in a consistent way. As described therein the thickness and density of the bale are directly influenced by the amount of crop material delivered to the plunger for each stroke thereof and the resistance applied to the bale being formed in the chamber behind the plunger. Resistance applied to the bale in the chamber is commonly controlled by variations in the size of the cross-section of the chamber through which the crop material is being urged by the plunger by adjusting the position of one or more of the chamber side walls to vary the orifice though which the crop material is extruded. In most approaches however the width or height of the chamber is being reduced at a constant rate along the length of the chamber, but this does not result in a constant pressure on the bale, while in improved approaches as in WO2010/100068, two zones are provided wherein the rate of change in cross-sectional area experienced by the bale travelling through the zones is different for those zones. For obtaining this, a bend or pivot is provided in at least one of the side walls, also called chamber doors. Such realization provides an increased resistance against which the plunger may compress the crop material to form the bale in a first zone, while in the second zone just a sufficient pressure on the bale surface is maintained.

It is a disadvantage of balers with a pivot in the side walls that for dry slippery crops as for example harvested in southern France, a big bend is needed to provoke sufficient resistance for baling at high density. This aggressive angle would create, however, too much resistance for longer and less dry crops, such as for example harvested in northern France or England.

SUMMARY OF THE INVENTION

It is an object of embodiments of the present invention to provide good methods and systems for harvesting biomass, which methods and systems are universally usable for different crop and moisture conditions.

It is an object of embodiments of the present invention to provide methods and systems (control system, adapted baler) for realizing high density bale manufacturing by enabling the use of the bend in the side doors technique or equivalents thereof while avoiding the problem of too high resistance for certain types of crop material and certain crop conditions, which problem might result in discontinued operation of the system and even overloads thereof which may damage certain parts of the involved systems.

The above objective is accomplished by methods and devices according to embodiments of the present invention.

In a first aspect of the present invention, a method is disclosed for preparing the manufacturing of bales of harvested crop material with a baler having a bale-forming chamber with an adaptable configuration along the length of the bale-forming chamber. The bale-forming chamber comprises a first part located closer to the inlet opening of the bale-forming chamber, having a fixed configuration, e.g. with respect to a baler frame, and a second part located closer to the outlet opening of the bale-forming chamber, the second part comprising four sides (also called side walls) defining a substantially rectangular opening through which a bale is urged along a bale travel axis from the inlet opening towards the rear outlet opening. The four sides comprise at least a pair of chamber doors arranged along two opposing sides of the bale-forming chamber, whereby each of said pair of chamber doors is pivotably connected at one end to the first part of the bale-forming chamber by means of a first pivotable connection and extends rearwards therefrom in a manner to allow the pair of chamber doors to be selectively pivoted inwards or outwards relative to the bale travel axis. At least one of the chamber doors, for example each of the chamber doors, comprises at least two sections which are pivotably connected to one another at a second pivotable connection, thus defining a door angle at this second pivotable connection. The method comprises obtaining, e.g. receiving or sensing, at least one crop parameter; selecting a value for the door angle of the bale-forming chamber based on the obtained crop parameter to thereby establish a suited pressure profile to be exerted upon the bale being compacted while moving through the bale-forming chamber during bale manufacturing; and adapting the configuration of the bale-forming chamber by adapting the position of the side sections of the bale chamber doors in accordance with the selected door angle value. It is an advantage of a method according to embodiments of the present invention that, by adapting the configuration of the bale-forming chamber by adapting the position of the side sections of the bale chamber doors in accordance with an obtained crop parameter, the baler with its adapted configuration may be more suitable for harvesting a particular type of crop material, and/or crop material with particular parameters. As an example, if bales of dry crop material have to be formed, enough counter-pressure needs to be given to the plunger, and a smaller input section is required, which may be obtained by adapting the position of the side sections of the bale-forming chamber doors so as to include a different door angle. On the other hand, if bales of wet crop material have to be formed, this material having other friction coefficients, a larger input section is needed, which again may be obtained by adapting the position of the side sections of the bale-forming chamber doors. A method according to embodiments of the present invention allows to use a same baler at different harvesting circumstances, for harvesting different types of crop material, and/or for harvesting crop material with different crop parameters.

In embodiments of the present invention, the crop parameter may be indicative for the crop humidity.

In further embodiments of the present invention, the bale-forming chamber has a varying cross-section along the length of the bale-forming chamber, defined in a direction from input to output side of the bale-forming chamber, and the rate of change of the cross-section is or can be made different in at least two parts of the bale-forming chamber along the length of the chamber, whereby the difference in rate of change is variable. This means that different configurations of the bale-forming chamber can be taken on, that for each configuration at least two different rates of change of the cross-section of the bale-forming chamber can be found, and that for at least a first configuration and a second configuration, the difference between the two corresponding rates of change can be different. The variation in the difference in the rate of change may be set depending on parameters of the crop material to be harvested. The variation in the difference in the rate of change corresponds to a variation in the door angle value.

In embodiments of the present invention the method is at least partially automated by obtaining the at least one crop parameter and/or by inputting the at least one crop parameter in a configuration selector, being part of the baler, and wherein the selecting of a door angle value of the bale-forming chamber is performed by said configuration selector. As an example, based on an obtained crop parameter such as crop humidity, the configuration selector may select an appropriate door angle value.

In embodiments of said partially automated method, the configuration selector may receive its input from a human input interface, for example via an operator of the baler. In alternative embodiments of said partially automated method, the configuration selector may receive its input from a crop parameter sensor, for example a humidity sensor. This way, a more accurate and faster adaptation of the configuration of the bale-forming chamber may be obtained, e.g. in case a crop parameter varies over a field to be harvested.

In embodiments of the present invention, selecting of a suitable door angle value, e.g. by the configuration selector, may comprise retrieving from a storage means, for example within the configuration selector, a predefined door angle value corresponding to an obtained crop parameter value. The storage means, e.g. a data storage such as a memory, may store different bale-forming chamber configurations in terms of door angle values in function of different crop parameter values, e.g. different humidity values. These may e.g. be stored in a table, such as a LUT (look-up table). Alternatively, the door angle values in function of crop parameter values could be stored as a mathematical function.

In embodiments of the present invention, adapting the bale-forming chamber configuration by adapting the door angle value may be performed by one or more actuators, acting on parts of the bale-forming chamber, more particularly on one or more of the side sections of the bale-forming chamber doors. These actuators may be driven by steering signals, for example provided by the configuration selector, which steering signals may be based on a relevant crop parameter.

In a second aspect of the invention, a baler for manufacturing bales of harvested crop material is provided, the bales having a predetermined density. The baler comprises a bale-forming chamber with an adaptable configuration along the length of the bale-forming chamber. The bale-forming chamber comprises a first part having a fixed configuration, and a second part comprising four sides (e.g. walls) defining a substantially rectangular opening through which a bale is urged along a bale travel axis from a front end input opening towards a rear end output opening. The four sides comprise a pair of chamber doors arranged along two opposing sides of the bale-forming chamber. Each of said pair of chamber doors is pivotably connected at one end to the first part of the bale chamber, at a first pivotable connection, and extends rearwards therefrom in a manner to allow the pair of chamber doors to be selectively pivoted inwards and outwards relative to the bale travel axis. In accordance with embodiments of the present invention, at least one of the chamber doors, e.g. each of the chamber doors, comprises at least two side sections which are pivotably connected relative to one another at a second pivotable connection, thus defining a door angle at this second pivotable connection. The baler furthermore comprises a configuration selector for obtaining at least one crop parameter and for selecting a door angle value for the bale-forming chamber in accordance with the obtained crop parameter to thereby establish a suited pressure profile to be exerted upon the bale being compacted while moving through the bale-forming chamber during bale manufacturing; and means for adapting the bale-forming chamber configuration by changing the position of the side sections of a chamber door with respect to one another in accordance with the selected configuration, so as to include the selected door angle value between them.

In an embodiment thereof the baler may further comprise a human input interface for providing the at least one crop parameter to the configuration selector. In an alternative embodiment thereof, the baler may further comprise a crop parameter sensor for providing a crop parameter related signal to the configuration selector.

In embodiments of the present invention the baler may further comprise one or more actuators, acting on parts of the bale-forming chamber, more particularly for example to one or more side sections of the bale chamber doors, in accordance with signals provided by the configuration selector.

In particular embodiments, the configuration selector may be adapted for selecting a door angle value between 140° and 180°, for example between 170° and 179°, for example a door angle value of 172°.

A third aspect of the present invention provides a control system for controlling the adaptation of the configuration of a baler having a bale-forming chamber with an adaptable configuration of the bale-forming chamber. The bale-forming chamber comprises a first part located closer to the inlet opening of the bale-forming chamber, having a fixed configuration, and a second part located closer to the outlet opening of the bale-forming chamber, comprising four sides defining a substantially rectangular opening through which a bale is urged along a bale travel axis from the inlet opening towards the rear outlet opening. The four sides comprise at least a pair of chamber doors arranged along two opposing sides of the bale-forming chamber, whereby each of said pair of chamber doors is pivotally connected at one end to the first part of the bale-forming chamber by means of a first pivotable connection and extends rearwards therefrom in a manner to allow the pair of chamber doors to be selectively pivoted inwards or outwards relative to the bale travel axis. At least one of the chamber doors, e.g. each of the chamber doors, comprises at least two sections which are pivotably connected to one another at a second pivotable connection, thus defining a door angle at this second pivotable connection. The control system comprises a configuration selector for obtaining at least one crop parameter and for selecting a door angle value to be defined by the position of the at least two side sections with respect to one another, the selection of the door angle value based on the obtained crop parameter to thereby establish a suited pressure profile to be exerted upon the bale being compacted while moving through the bale-forming chamber during bale manufacturing, and a signal generator for generating at least one steering signal for adapting the configuration of the bale-forming chamber by adapting the position of the side sections with respect to one another in accordance with the selected door angle value.

The control system may be adapted for generating a least one steering signal for steering at least one actuator. The at least one steering signal may be applied to the at least one actuator for acting on parts of the bale-forming chamber, more particularly on at least one side section of a bale-forming chamber door so as to adapt the configuration of the bale-forming chamber, more particularly to adapt the position of the side sections of a chamber door with respect to one another.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings.

FIG. 2 shows a schematic view on the structural elements involved in embodiments of the invention. In particular is schematically shown a baler with a bale chamber with a front end inlet opening (where crop material is fed into the machine) and a rear end outlet opening (where manufactured bales are ejected out of the machine), wherein the bale chamber has a varying cross-section along the length of the bale chamber (in the direction defined by the baling funnel). The bale chamber comprises a first part having a fixed configuration, and a second part comprising four sides defining a substantially rectangular opening. The four sides comprise at least a pair of chamber doors arranged along two opposing sides of the bale chamber. At least one of the chamber doors, e.g. each of the chamber doors, comprises at least two side sections which are pivotally connected relative to one another. The rate of change of the cross-section is different in at least two portions along the length of the second part of the chamber. The baler may include a configuration selector with storage means, for obtaining the crop parameter and generating signals for steering one or more actuators for acting on the side sections. Also the step of adapting the configuration is indicated.

FIG. 4 shows a top view of an embodiment of part of a bale chamber according to the present invention, wherein the bale chamber has a varying cross-section along the length of the bale chamber (in the direction defined by the baling funnel). The rate of change of the cross-section is different in at least two portions along the length of the chamber. In accordance with embodiments of the present invention, the difference in rate of change is variable (i.e. adjustable) since the bale chamber comprises, in a second part, a plurality of connected side sections forming side doors, whereby the entire set of said side sections might be pivotally connected to the bale chamber frame, more particularly to the first, fixed, part of the bale chamber, in order to enable control, e.g. based on the pressure experienced by a plunger, but also their relative position (angle(s)) is/are adaptable (see pivot), e.g. by using an actuator.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is to be understood that embodiments of the invention may be practiced without these specific details. In other instances, well-known methods, structures and techniques have not been shown in detail in order not to obscure an understanding of this description.

Where in embodiments of the present invention reference is made to agricultural balers, reference is made to machines for forming bales from agricultural crop material, such as forming cuboid-shaped bales by any suitable means, e.g. plungers.

Where in embodiments of the present invention reference is made to crop material, reference is made to any suitable type of biomass that can be harvested and packed in bales, such as for example hay, silage, straw or other.

Figure 6:
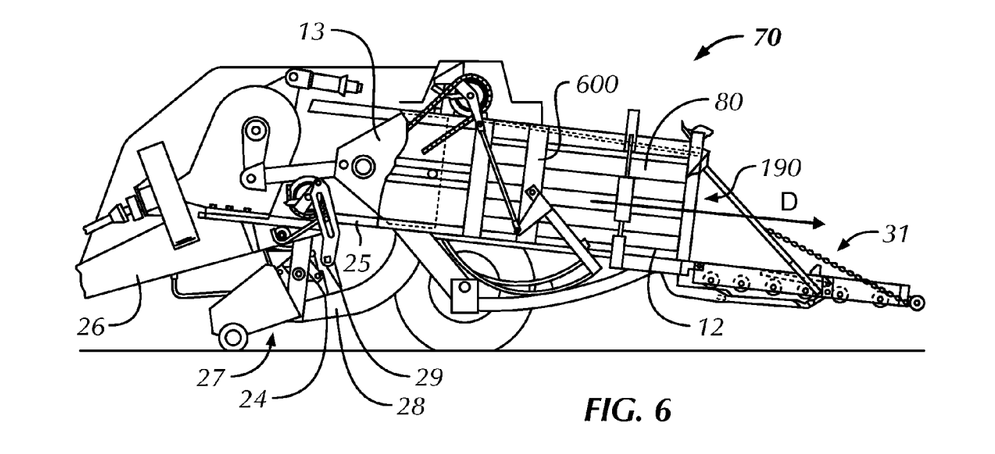
FIG. 6 illustrates a rectangular baler to which a bale configuration selector and means for changing positions of the side sections of bale chamber doors with respect to one another in accordance with embodiments of the present invention can be applied.

Referring to the drawings, FIG. 6 shows an agricultural baler 70 comprising a frame 25 which is equipped with a forwardly extending tongue 26 at its front end with hitch means (not shown) for coupling the baler 70 to a towing tractor. A pick-up assembly 27 lifts windrowed crop material off the field as the baler 70 is travelled thereover, e.g. while being pulled by a tractor, and delivers such material into the front end of a rearwardly and upwardly curved, charge-forming feeder duct 28. The duct 28 communicates at its upper end with an overhead, fore-and-aft extending bale chamber 80 into which crop charges are loaded by a cyclically operating stuffer mechanism 29. A continuously operating packer mechanism 24 at the lower front end of the feeder duct 28 continuously feeds and packs material into the duct 28 so as to cause charges of the crop material to take on and assume the internal configuration of the duct 28 prior to periodic engagement by the stuffer 29 and insertion up into the bale chamber 80. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 80.

A plunger 13 reciprocates in a fore-and-aft direction within the bale chamber 80. Biomass fed via the feeder duct 28 is thereby compacted, e.g. compressed or otherwise treated, so as to form bales in the above-described operation of the agricultural baler 70. Cuboid-shaped bales are formed. The formed bales may then be moved forward by the reciprocating motion of the plunger 13 to shift them serially and incrementally along the bale chamber 80 in a forward direction D towards a discharge outlet opening 190, wherefrom the bales may eventually be ejected. The baler 70 may furthermore comprise components such as a knotter mechanism for automatically tying the completed bales with e.g. twine or similar lineal object to make them self-supporting, for example for shipping and storage. Once tied, the bales are discharged from the discharge outlet opening 190 of the bale chamber 80 onto a discharge in the form of a chute, generally designated 31, for gently lowering the bales near ground level.

Aspects of the present invention generally relate to a bale chamber 80 and to a method or control system for preparing such a bale chamber 80 of a baler 70 for manufacturing high density bales of harvested crop material. Aspects of the present invention also relate to a baler 70 for manufacturing high density bales of harvested crop material, adapted for being used for a variety of types of crop material and for a variety of crop conditions by enabling the use of a bend in the side doors technique or equivalents thereof.

In one aspect, the present invention provides a method for bale chamber configuration adaptation, for a bale chamber 80 comprising a first part 82 having a fixed configuration with respect to a baler frame 25, i.e. a fixed part of which the shape and dimension cannot be changed, and a second part 83 comprising four side walls defining a substantially rectangular opening through which a bale is urged along a bale travel axis from a front end inlet opening 180 towards a rear end output opening 190. The second part 83 comprises at least one side wall which is split in two or more sections 160a, 160b, which are pivotally connected relative to one another. Hereby, the relative position (angle) of one section 160a relative to another one 160b can be modified by taking on any of two or more, e.g. predetermined, positions (thereby defining different door angles between the sections 160a, 160b, hence different bale chamber configurations 50). The method is characterized in that the chamber configuration adaptation, e.g. the door angle adaptation, is performed as a function of one or more crop parameters, such as crop humidity and/or crop type. It is to be noted that the entire configuration of the side walls may be moveable relative to the baler frame 25, in order to realize sufficient pressure on the plunger 13, used to push the bales through and out of the bale chamber 80, while the change of the relative position of the door sections 160a, 160b establishes a suited pressure profile to be exerted upon the bale being compacted while moving through the bale-forming chamber during bale manufacturing in order to realize high density bales. The crop parameter(s) (e.g. crop type) can be manually entered e.g. via human input interface (like a keyboard), or can be derived from a sensor directly measuring a crop parameter, e.g. a humidity sensor, or a sensor indirectly measuring a crop parameter by verifying whether the designed pressure is realized, e.g. by measuring the friction acting on the bale while moving through the baling funnel or by using a type of hydraulic sensor as described in U.S. Pat. No. 4,750,418 which provides a means for sensing the load on a wall of a bale chamber.

It is to be noted that defining what a suited pressure profile is, of course depends on what the user finally wants, e.g. it might be that in certain circumstances no high density operation is desired at all. The invention, however, enables bale chamber configuration selection by door angle selection while taking into account, besides what the user desires, also crop information in the form of one or more crop parameters. In one embodiment of the invention, in particular when high density baling operation is desired, with "suited pressure profile" is meant that profile realizing high density operation without exceeding a predetermined pressure on the plunger 13, in order to prevent damage to the plunjer and/or discontinued operation.

Figure 1A:
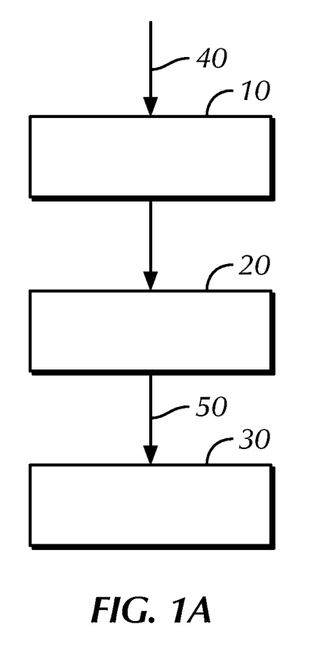
FIG. 1a shows a flow chart of a method according to embodiments of the present invention, indicating the step of obtaining at least one crop parameter, followed by a step of selecting a configuration of a bale chamber, more particularly selecting a door angle value, followed by a step of adapting the configuration of the bale chamber, more particularly the door angle, in accordance with the selected door angle value.

In an embodiment of the invention as diagrammatically illustrated in FIG. 1a, a method is provided for preparing the manufacturing of bales of harvested crop material with a baler 70 with a bale chamber 80 having an adaptable configuration, i.e. adaptable door angle, along the length direction 110 of the bale chamber 80. In a method according to embodiments of the present invention, upon obtaining 10, e.g. receiving, at least one crop parameter 40, a configuration 50, i.e. a particular door angle value α, of the bale chamber 80 is selected, based on the obtained crop parameter 40. Thereafter, the configuration of the bale chamber 80 is adapted in accordance with the selected configuration 50, i.e. the selected door angle α, to thereby establish a suited pressure profile to be exerted upon the bale being compacted while moving through the bale-forming chamber during bale manufacturing. FIG. 1a provides a flow chart, indicating the step of obtaining 10 at least one crop parameter 40, followed by a step of selecting 20 a configuration 50 of the bale chamber 80, i.e. a particular selected door angle value α, followed by the step of adapting 30 the configuration, i.e. the door angle of the bale chamber 80 in accordance with the selected configuration 50.

Figure 2:
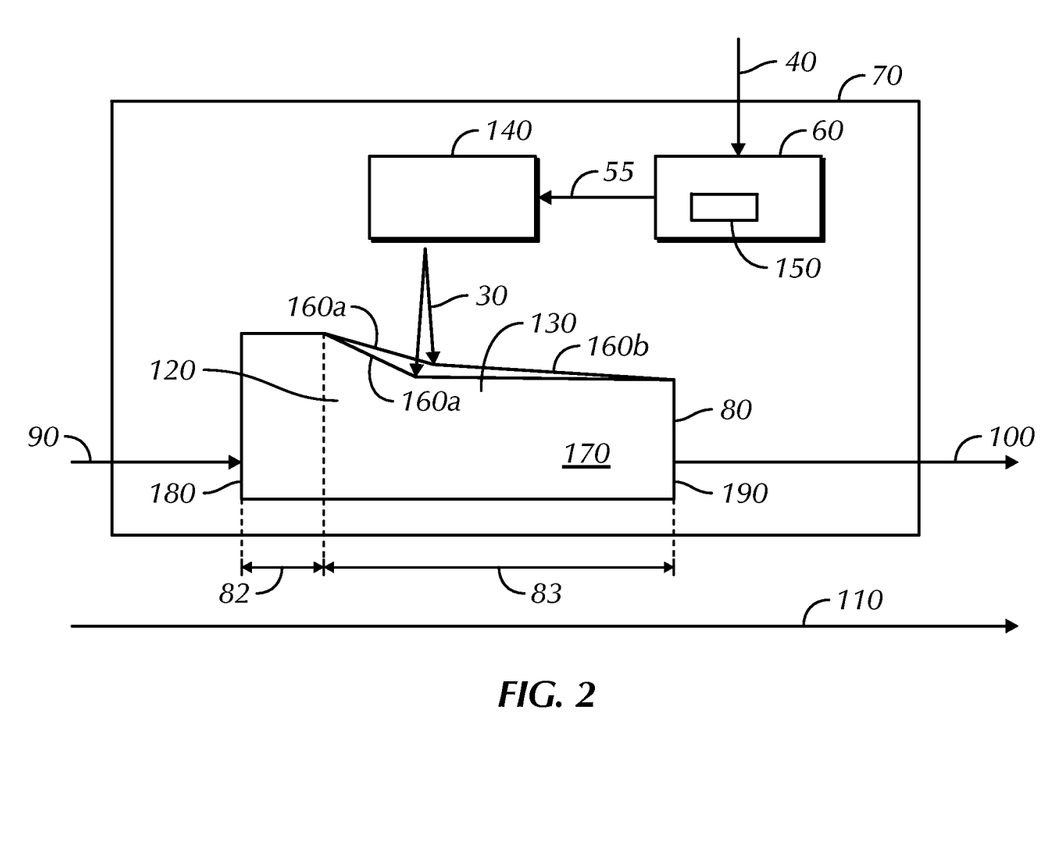

A schematic representation of a baler 70 with bale chamber 80 is shown in FIG. 2. The bale chamber 80 has a front end inlet opening 180 (where the crop material is fed into the bale chamber 80 as indicated by arrow 90) and a rear end outlet opening 190 (where the manufactured bales are ejected out of the bale chamber 80 as indicated by arrow 100). A baling funnel 170 is provided between the front end inlet opening 180 and the rear end outlet opening 190, by the configuration of the first part 82 and the second part 83 of the bale chamber 80, in particular by the position of the side walls of the second part 83 with respect to the first part 82, including side walls actually placed at left and right sides of the bale chamber 80, bottom and ceiling of the bale chamber 80, and by the position of at least two sections 160a, 160b of at least one of such side walls, with respect to one another, these sections 160a, 160b thus defining a door angle between them. The side walls forming the second part 83 are pivotable with respect to the first part 82. At least one of the side walls of the second part 83 comprises at least two sections 160a, 160b which are pivotable with respect to one another. The baling funnel 170 is provided in the direction 110 of the length of the bale chamber 80. In embodiments of the present invention, the bale chamber 80 has a varying cross-section along the length direction 110 of the bale chamber 80 (in the longitudinal direction of the baling funnel 170), and the rate of change of the cross-section is or can be made different in at least two portions 120, 130 in the second part 83 along the length direction 110 of the chamber 80. Moreover, in accordance with embodiments of the present invention, the difference in the rate of change between the two portions 120, 130 is variable. Hereto, a wall of the bale chamber 80 comprises a plurality of connected side sections 160a, 160b, i.e. two or more connected side sections, whereby in the direction 110 of the baling funnel at least two of the side sections are pivotally connected relative to one another such that at least two bale chamber configurations can be realized, whereby the side sections 160a, 160b define a different door angle in one or the other configuration. When realizing another configuration, the angle α between two side sections 160a, 160b is modified. As soon as the angle α between two pivotally connected side sections 160a, 160b differs from 180°, there exist two portions 120, 130 in the bale chamber 80 that have a different rate of change of their cross-section perpendicular to the length of the bale chamber 80. The difference between the rates of change of the cross-sections may be calculated. By changing the angle α between two adjacent side sections 160a, 160b pivotally connected with respect to one another, the rate of change of the cross-section of at least one portion 120, 130 changes, and hence also the difference between the rates of change of the cross-sections for both portions. Hence, in accordance with embodiments of the present invention, the difference in the rate of change of the cross-sections of the portions 120, 130 is variable over time.

In a particular embodiment of the present invention, the crop parameter 40 is indicative for the crop humidity. In other embodiments of the invention other crop parameters 40 can also be used, e.g. crop type. Also multiple crop parameters may be used for determining the required bale chamber configuration, e.g. the required door angle α between sections 160a, 160b of a chamber wall. In embodiments of the present invention where at least one chamber door comprises three or more sections, more than one door angle may be set for that chamber door. Also in embodiments where two chamber doors each comprise at least two sections 160a, 160b which are moveable with respect to one another, the door angle between the sections 160a, 160b of a first door may be different from the door angle between the sections 160a, 160b of a second door.

In embodiments of the present invention, also the required bale density level might be input as information for selecting bale chamber configuration.

Figure 4:
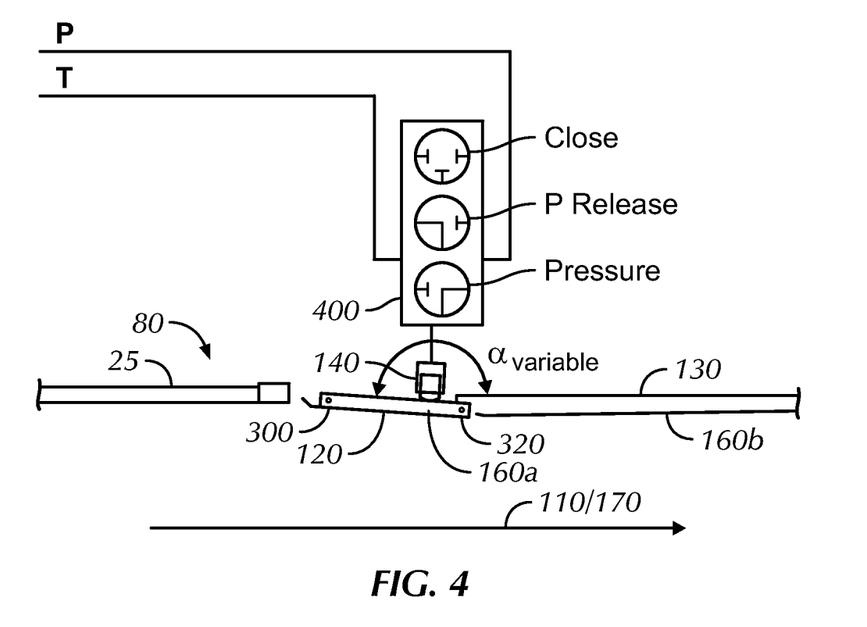

It is to be noted that in all described embodiments the relative positions of the side sections 160a, 160b of a wall relative to one another can take on two or more discrete values, or even a continuous spectrum (within a range of values) such that two or more bale chamber configurations can be realized. Those configurations are distinguished by the realized angle between the sections. With reference to FIG. 4, the angle α shown there can be e.g. between 140° and 180°. As examples, in the embodiment illustrated in FIG. 4, a continuous spectrum of angles between 140° and 180° can be realised. Alternatively, as will be discussed later, e.g. in the embodiment illustrated in FIG. 5, the side sections 160a, 160b of one wall can take a plurality of, in the example illustrated three, distinct positions relative to one another. Hence the side sections 160a, 160b of a wall can include a plurality of, in the example illustrated three, discrete angles between them.

It is to be noted that the present invention of adapting bale chamber configuration based on crop parameter is equally applicable to bale chambers with multiple bends.

Figure 5:
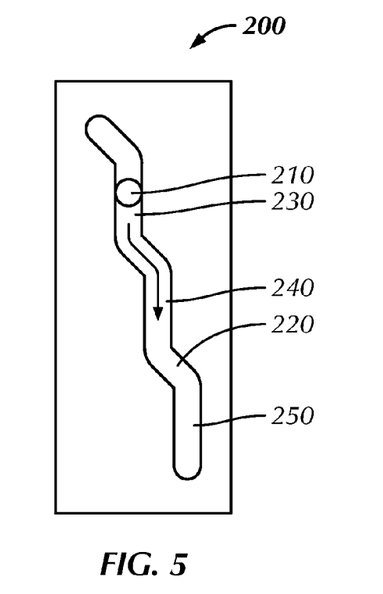
FIG. 5 illustrates one embodiment of a mechanical means which can realize different bale chamber configurations by moving a moveable element, itself connected to a bale chamber wall section (not shown here) in a groove in one of a plurality, in the embodiment illustrated three, provided levels, thereby also adapting the relative position of the connected bale chamber wall section.
Figure 7:
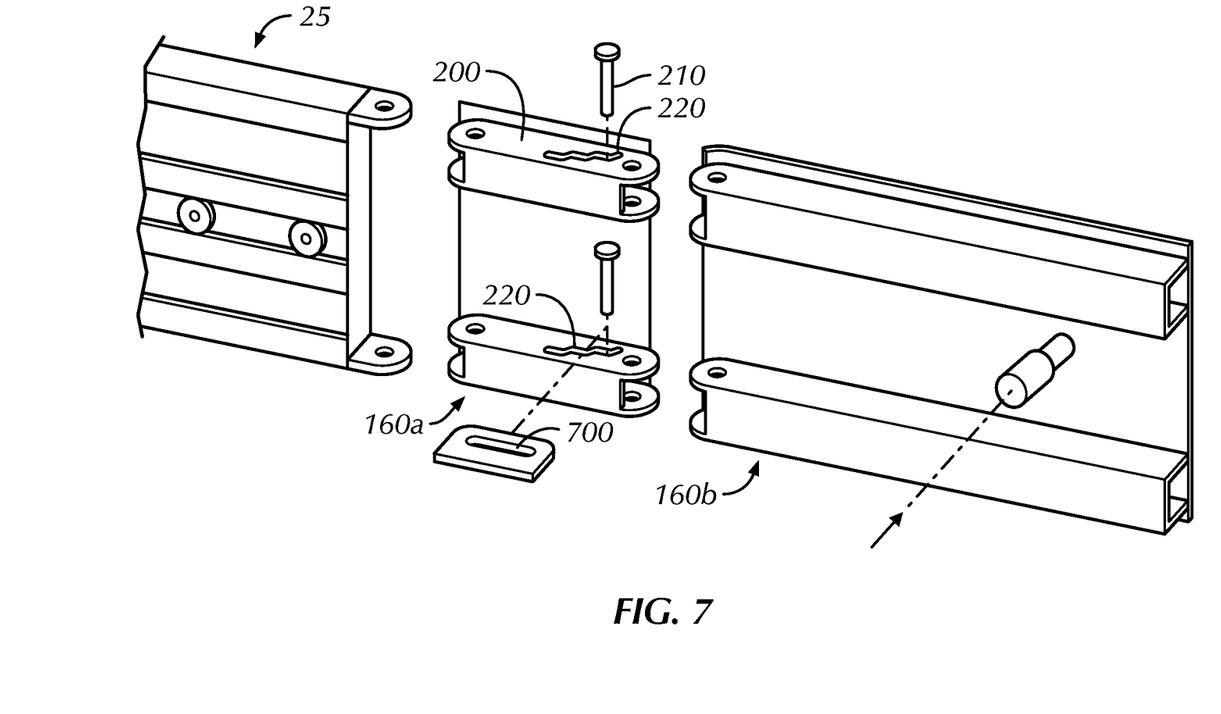
FIG. 7 illustrates part of a side wall of a baler on which a mechanical means as in FIG. 5 is implemented, in accordance with embodiments of the present invention.

In embodiments of the present invention, the configuration change, i.e. the change of the door angle, of the bale chamber 80 may be realized by use of mechanical means. It is an advantage of such mechanical means that most often they can be realized on little space. The mechanical means may be operated manually, for example by an operator operating the baler 70. One embodiment of such mechanical means is shown in FIG. 5. The mechanical means comprises a plate 200 comprising a groove 220 having a plurality of levels, in the example illustrated three levels 230, 240, 250. Each level corresponds to a particular position of a side section 160a, 160b. The moveable side sections 160a, 160b are provided with a moveable element 210 connected to the side section 160a, 160b, which can be moved in the groove 220. Different positions of the moveable element 210 in the groove 220 realize a plurality of different bale chamber configurations, as moving the moveable element 210 in the groove 220 changes the relative position, hence the door angle, of the connected side section relative to the other side section to which the particular side section is pivotably mounted. A more detailed view (e.g. from the exterior of the bale chamber) of such embodiment is illustrated in FIG. 7. To adjust the angle between the front section 160a of a bale chamber door and the rear section 160b of the door two supporting pins 210 can be installed in the Z shape slot 220 in the front section 160a. To keep this front section 160a in a selected (temporarily fixed) position the pin 210 is held in a second slot 700 which is part of the main frame 25. This second slot 700 that is part of the main frame structure 25 could optionally be combined with the needle yoke pivot support 600 as illustrated in FIG. 6. An advantage of using this Z shape slot 220 in the front section 160a of the door and the straight slot 700 in the main frame 25 is that the pin 210 can be relocated to a position corresponding to a lower density level by sliding the pin 210 trough the slot without emptying the bale chamber and taking the bale pressure of. Also this system is compact so it can be built in a baler 70 that should not exceed max homologation width.

Alternative embodiments of a mechanical means which is manually operated may be contemplated, for example comprising a plurality of holes on a piece fixed with respect to the baler frame 25 and a pin fixed on a side section 160b and having a shape and size adapted for fitting into the holes, whereby the selection of a particular hole for fitting the pin into determines the configuration of the bale chamber 80. In alternative embodiments, the pin may be fixed onto a piece fixed with respect to the baler frame 25, and the plurality of holes may be provided in a side section 160b or another part pivotable with respect to the baler frame 25.

Yet alternative embodiments of mechanical means might include a threaded rod which may be screwed against a side section 160a, 160b to displace it so as to change an angle α included between two side sections 160a, 160b pivotally connected with respect to one another.

Figure 1B:
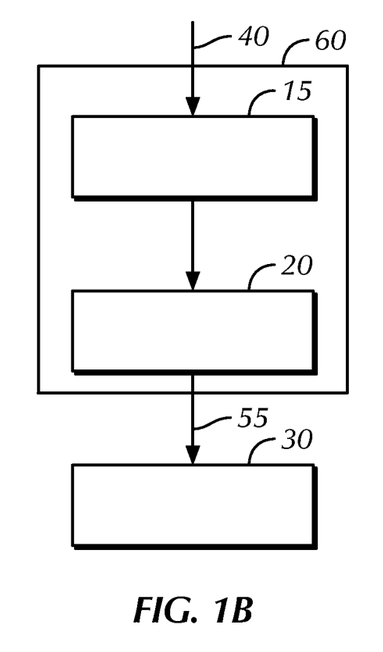
FIG. 1b shows a flow chart of an automated method embodiment of the present invention, wherein the step of obtaining the crop parameter is realized by a step of inputting this information into a configuration selector, and the step of adapting the configuration by adapting a door angle is realized by generating steering signals for steering at least one actuator for acting on parts of the bale chamber, more particularly on side sections of bale chamber doors, in order to adapt the bale chamber configuration by adapting the door angle.

In another embodiment of the invention as diagrammatically shown in FIG. 1b, an automated method is described, wherein obtaining the at least one crop parameter 40 is performed by inputting 15 the at least one crop parameter 40 in a configuration selector 60, being part of the baler 70. Selecting 20 a configuration 50, i.e. a door angle, of the bale chamber 80 may be performed by said configuration selector 60. FIG. 1b shows a flow chart of such automated embodiment of the invention. The step of adapting 30 the configuration, i.e. changing the door angle, may then be realized by generating steering signals 55 that may be used to steer at least one actuator 140, acting on parts of the bale chamber 80, for example side sections 160a, 160b or parts connected to the side sections 160a, 160b, in order to adapt the bale chamber configuration by changing the position of a side section 160a of a side wall with respect to the position of another side section 160b of the side wall. Also the step 30 of actually adapting the configuration is indicated.

FIG. 2 shows a baler including a configuration selector 60. A crop parameter 40 is obtained by the configuration selector 60, e.g. is input for example via a human input interface like a keyboard, via a separate button identifying a crop type or via a sensor, e.g. a crop humidity sensor. Based on the obtained crop parameter 40, in the embodiment illustrated the configuration selector 60 generates steering signals 55 for steering one or more actuators 140 acting on parts of the bale chamber 80 so as to change its configuration.

In other embodiments of the invention a mixed approach may be applied, wherein part of the method is executed manually, for example by an operator operating the baler 70. The part of the method executed manually may include for example determining a range or a value of the angle between two pivotable side sections 160a, 160b, e.g. by selecting the position of a mechanical means as described in FIG. 5, as a function of a first crop parameter, e.g. the type of crop. This may then for example be followed by another part of the method, which is supported by means to automate this other part of the method. As an example, the angle may then further be fine tuned e.g. by controlling the angle via an actuator as a function of a second crop parameter e.g. real-time measured humidity of the harvested crop material.

In embodiments of the invention, the configuration selector 60 can be realized as an electronic device, as a generic programmable device, e.g. a CPU combined with memory, programmed for the configuration selection in accordance with embodiments of the present invention, or as a dedicated device, e.g. an ASIC, specifically designed for performing the functions of configuration selection in accordance with embodiments of the present invention, or as a combination of such approaches.

In embodiments of the invention, the configuration selector 60 may have storage means 150 such as RAM, ROM or any other memory device, wherein configurations, including door angles, are stored, for example indexed with a corresponding crop parameter in a tabular form, such that based on an obtained crop parameter, a suitable door angle can be selected. For a one-parameter system a 1 dimensional array or table can be used. For a multiple-parameter system, a more dimensional array can be used, e.g. for N way parameter systems an N dimensional array or table can be defined. The values in the array or table can be provided from initial test experiments e.g. performed by the manufacturer. In particular embodiments, also means for adapting those initial values, preferably in between a range with safety bounds, based on experiences performed by the user of the machine can be provided.

Figure 3:
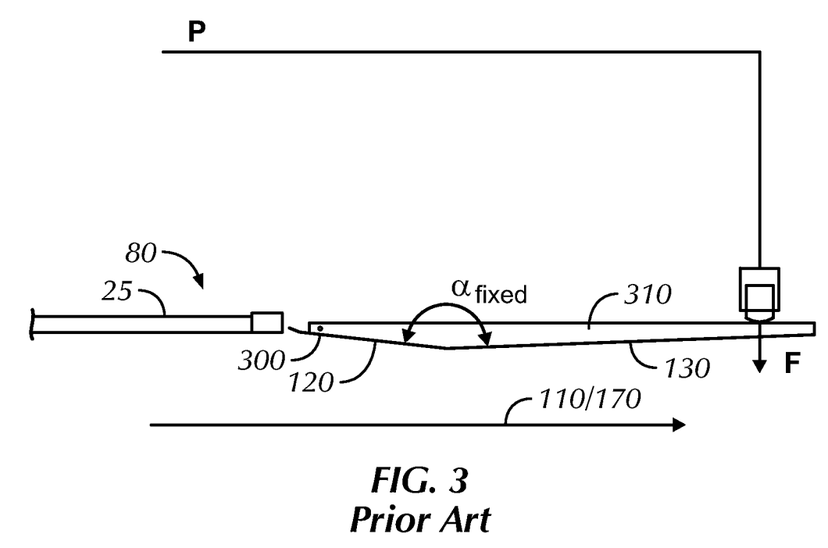
FIG. 3 shows a top view of a prior-art bale chamber wherein the bale chamber has a varying cross-section along the length of the bale chamber (in the direction defined by the baling funnel), whereby the rate of change of the cross-section is different in at least two portions along the length of the chamber. However, in this prior art bale chamber the difference in rate of change in the second part is essentially fixed since the bale chamber comprises a side door with a bended profile (see the angle α), whereby the entire side door might be pivotally connected to the bale chamber frame in order to enable control, e.g. based on the pressure experienced by a plunger, but the bend/angle is fixed.

In embodiments of the invention as shown in FIG. 4, the bale chamber 80 has a varying cross-section along the length direction 110 of the bale chamber 80 (in the direction defined by the baling funnel 170), whereby the rate of change of the cross-section can be made different in at least two portions 120, 130 along the length direction 110 of the chamber 80. The difference in rate of change is variable since the second part 83 of the bale chamber 80 comprises a plurality of connected side sections 160a, 160b, whereby the entire set of said side sections 160a, 160b might be pivotably connected to the bale chamber frame 25, or the first part 82 fixed with respect to the frame 25, by means of a first pivot 300, in order to enable control, e.g. based on the pressure experienced by the plunger. This pivotable connection of a door 310, however not comprising a plurality of sections, is illustrated in FIG. 3. However, in accordance with embodiments of the present invention also the relative position (angle) between two neighboring side sections 160a, 160b of a door is adaptable (for example pivotable around a pivot 320), e.g. by using an actuator 140.

Indeed in particular embodiments of the invention the discussed adaptations 30 of the bale chamber configuration may be performed by one or more actuators 140, acting on parts of the bale chamber 80, in accordance with steering signals 55, for example provided by the configuration selector 60.

The invention also provides a baler 70 for manufacturing bales of harvested crop material. The baler according to embodiments of the present invention comprises: a bale chamber 80 comprising a first part 82 having a fixed configuration, and a second part 83 comprising four sides defining a substantially rectangular opening through which a bale is urged along a bale travel axis from a front end inlet opening towards a rear end outlet opening. The four sides comprise a pair of chamber doors arranged along two opposing sides of het bale chamber. The pair of chamber doors is pivotally connected at one end to the first part 82 by pivot 300, and extends rearwards therefrom in a manner to allow the pair of chamber doors to selectively pivot inwards and outwards relative to the bale travel axis. At least one of the chamber doors comprises at least two side sections 160a, 160b which are pivotably connected relative to one another at a second pivot 320, thus defining a door angle between them. The baler 70 furthermore comprises a configuration selector 60 for obtaining 10, e.g. for receiving 15, at least one crop parameter 40 and for selecting 20 a door angle value for the bale chamber 80 in accordance with the obtained crop parameter 40 to thereby establish a suited pressure profile to be exerted upon the bale being compacted while moving through the bale chamber during bale manufacturing; and means 140 for adapting the position of the sections 160a, 160b with respect to one another so as to include the selected door angle value between them.

In embodiments of the present invention the rate of change of the cross-section is or can be made different in at least two portions 120, 130 along the length direction 110 of the chamber, for example by changing an angle α included between two side sections 160a, 160b of a chamber wall, and the difference in rate of change is variable.

In embodiments of the present invention, the bale chamber 80 may comprise a plurality of connected side sections 160a, 160b, whereby in the direction 110 of the baling funnel 170 at least two of the side sections are pivotably connected to one another such that at least two bale chamber configurations can be realized. The two bale chamber configurations are such that, due to pivoting of one side section 160a with respect to another 160b, the rate of change of the cross-sections of different parts of the bale chamber 80 is different, and such that also the difference in rate of change of the cross-sections of different parts of the bale chamber 80 for different bale chamber configurations 50 is different.

In embodiments of the present invention, the bale chamber configuration adaptation may be realized by providing a mechanical means, e.g. a pin or bar, fixing the relative position of the bale chamber wall sections, once placed in their selected relative position (see e.g. FIG. 5).

In alternative embodiments the bale chamber configuration may be realized with hydraulic means instead. This is illustrated for example in FIG. 4. In the embodiment illustrated, the hydraulic circuit comprises a feed line P and a return line T. The feed line P is a high-pressure line supplying pressurized hydraulic fluid to the actuated machinery, in embodiments of the present invention at least one actuator 140 for changing the position of sections 160a, 160b of a door of a bale chamber 80. The return line T returns the hydraulic fluid to a pump after doing the work to move the actuated machinery. Elements of the hydraulic circuit to bring pressure onto the feed line P (pump), and elements of the hydraulic circuit to receive hydraulic fluid back from the return line T are not illustrated, as they are known to a person skilled in the art. Between the feed line P and the return line T, a valve 400 is provided which can assume different positions. The valve 400 is intended for hydraulically driving the actuator 140. The valve has three ports, an input port connected to the feed line P, an output port connected to the return line T, and an actuation port connected to the actuator 140, for example a hydraulic cylinder.

If the valve 400 assumes a first position, which is the bottom position as illustrated in FIG. 4, pressurized hydraulic fluid is applied to the actuator 140, for example into the housing of a cylinder, so as to move a piston under action of the hydraulic liquid under pressure. The piston is moved out of the housing, and the corresponding section 160a of the chamber wall is moved in a direction toward the center of the baling funnel 170 by rotation around the first and second pivots 300 and 320. The door angle α is changed. The connection to the return line T is blocked.

If the valve 400 assumes a second position, which is the middle position as illustrated in FIG. 4, the connection to the feed line P is blocked, and the actuator 140 is hydraulically connected to the return line T. Hydraulic fluid within the housing of the cylinder flows back to a reservoir, the piston moves back into the housing, thus releasing its pressure on the corresponding section 160a of the chamber door, which can move away from the center line of the baling funnel 170 by rotation around pivots 300 and 320. Again, the door angle α is changed.

If the valve 400 assumes a third position, which is the top position as illustrated in FIG. 4, the connection to the feed line P, the connection to the return line T and the connection to the actuator 140 are all hydraulically blocked. The actuator is not driven up nor down, hence the corresponding section 160a is not actuated, and the chamber door remains at its previous (temporary fixed) position. The door angle α remains constant.

In another embodiment of the invention the configuration selector 60 has also driver circuits for generating the necessary steering signals 55 for steering at least one actuator 140, for example an electrical actuator such as an electrical motor, acting on parts of the bale chamber 80 in order to adapt the bale chamber configuration.

Finally the invention also provides a control system for controlling adaptation of the configuration of a baler 70 having a bale chamber 80 comprising a first part 82 having a fixed configuration and a second part 83 comprising four sides defining a substantially rectangular opening through which a bale is urged along a bale travel axis from a front end inlet opening 180 towards a rear end outlet opening 190. The four sides comprise a pair of chamber doors arranged along two opposing sides of the bale chamber 80, each of said pair of chamber doors at one end being pivotally connected to the first section 82 of the bale chamber 80 and extending rearwards therefrom in a manner to allow the pair of chamber doors to be selectively pivoted inwards and outwards relative to the bale travel axis. At least one of the chamber doors comprises at least two side sections 160a, 160b which are pivotably connected relative to one another, thus defining a door angle at the pivotable connection 320. The control system comprises a configuration selector 60 for obtaining 10 at least one crop parameter 40 and for selecting 20 a door angle value between side sections 160a, 160b of at least one chamber door of the bale chamber 80 based on the obtained crop parameter 40 to thereby establish a suited pressure profile to be exerted upon the bale being compacted while moving through the bale chamber 80 during bale manufacturing; and a signal generator for generating at least one steering signal 55 for adapting 30 the configuration of the bale chamber 80 in accordance with the selected door angle value.

The invention claimed is:

1. A baler for manufacturing bales of harvested crop material, the baler comprising:
   a bale chamber comprising a first part having a fixed configuration, and a second part comprising four sides defining a substantially rectangular opening through which a bale is urged along a bale travel axis from a front end inlet opening towards a rear end outlet opening, the four sides comprising a pair of chamber doors arranged along two opposing sides of the bale chamber, each of said pair of chamber doors being pivotably connected at one end to the first part of the bale chamber and extending rearwards therefrom in a manner to allow the pair of chamber doors to be selectively pivoted inwards and outwards relative to the bale travel axis, wherein at least one of the chamber doors comprises at least two side sections which are pivotally connected relative to one another, thus defining a door angle at a pivotable connection;
   a configuration selector for obtaining at least one crop parameter and for selecting a door angle value for the bale chamber in accordance with the obtained crop parameter to thereby establish a suited pressure profile to be exerted upon the bale being compacted while moving through the bale chamber during bale manufacturing; and means for changing the position of the side sections with respect to one another so as to include the selected door angle value between them.

2. The baler according to claim 1, further comprising a human input interface for providing the at least one crop parameter to the configuration selector.

3. The baler according to claim 1, further comprising a crop parameter sensor for providing a crop parameter related signal to the configuration selector.

4. The baler according to claim 1, further comprising one or more actuators, for acting on parts of the bale chamber in accordance with signals provided by the configuration selector so as to change the mutual position of the side sections so as to include the selected door angle value between them.

5. The baler according to claim 1, wherein the configuration selector is adapted for selecting a door angle value between 140° and 180°.

6. A method for preparing bales of harvested crop material with a baler having a bale chamber comprising a first part having a fixed configuration, and a second part comprising four sides defining a substantially rectangular opening through which a bale is urged along a bale travel axis from a front end inlet opening towards a rear end outlet opening, the four sides comprising a pair of chamber doors arranged along two opposing sides of the bale chamber, each of said pair of chamber doors being pivotably connected at one end to the first part of the bale chamber and extending rearwards therefrom in a manner to allow the pair of chamber doors to be selectively pivoted inwards and outwards relative to the bale travel axis, wherein at least one of the chamber doors comprises at least two side sections which are pivotably connected relative to one another, thus defining a door angle between them at a pivotable connection, the method comprising the steps:

obtaining at least one crop parameter;

selecting a value for the door angle of the bale chamber based on the obtained crop parameter to thereby establish a suited pressure profile to be exerted upon the bale being compacted while moving through the bale chamber during bale manufacturing; and adapting the position of the side sections with respect to one another in accordance with the selected door angle value.

7. The method according to claim 6, wherein the crop parameter is indicative for crop humidity.

8. The method according to claim 6, wherein, the bale chamber having a varying cross-section along the length direction of the bale chamber, wherein the rate of change of the cross-section can be made different in at least two portions along the length direction of the bale chamber and wherein the difference in rate of change is variable.

9. The method according to claim 6, wherein obtaining the at least one crop parameter comprises inputting the at least one crop parameter in a configuration selector part of the baler; and wherein the selecting of a door angle value of the bale chamber is performed by said configuration selector.

10. The method according to claim 9, wherein obtaining the at least one crop parameter comprises inputting the at least one crop parameter in the configuration selector by a human input interface.

11. The method according to claim 9, wherein obtaining the at least one crop parameter comprises reception of the at least one crop parameter by the configuration selector from a crop parameter sensor.

12. The method according to claim 6, wherein selecting the door angle value comprises retrieving from a storage means a predefined configuration corresponding to the obtained crop parameter.

13. The method according to claim 6, wherein adapting the door angle value is performed by one or more actuators, acting on parts of the bale chamber.

14. A control system for controlling a baler having a bale chamber comprising a first part having a fixed configuration and a second part comprising four sides defining a substantially rectangular opening through which a bale is urged along a bale travel axis from a front end inlet opening towards a rear end outlet opening, the four sides comprising a pair of chamber doors arranged along two opposing sides of the bale chamber, each of said pair of chamber doors being pivotably connected at one end to the first section of the bale chamber and extending rearwards therefrom in a manner to allow the pair of chamber doors to be selectively pivoted inwards and outwards relative to the bale travel axis, wherein at least one of the chamber doors comprises at least two side sections which are pivotably connected relative to one another, thereby defining a door angle at a pivotable connection, the control system comprising:

a configuration selector for obtaining at least one crop parameter and for selecting a door angle value defined by the position of the at least two side sections with respect to one another, the selection of the configuration being based on the obtained crop parameter, to thereby establish a suited pressure profile to be exerted upon the bale being compacted while moving through the bale chamber during bale manufacturing; and a signal generator for generating at least one steering signal for adapting the position of the at least two side sections with respect to one another in accordance with the selected door angle value.

15. The control system according to claim 14, wherein the generated at least one steering signal is applied to at least one actuator for acting on at least one side section of a bale chamber door so as to adapt the position of side sections of the bale chamber door with respect to one another.

* * * * *